Figure 1:
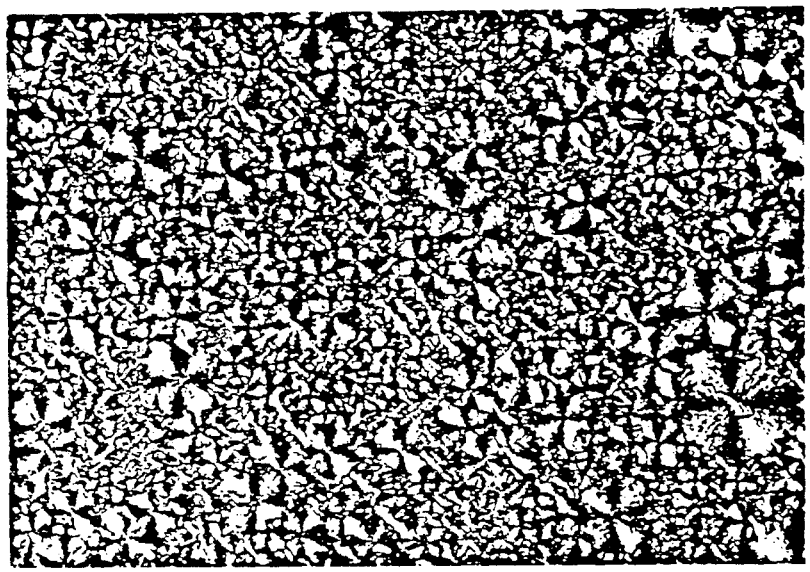

United States Patent [19]

Nakamura et al.

[11] Patent Number: 5,009,811

[45] Date of Patent: Apr. 23, 1991

[54] CONDUCTING VARNISH COMPOSITION

[75] Inventors: Tomio Nakamura, Ichikawa; Shigeru Shimizu, Yokohama; Kikuko Takeuchi, Yokohama, all of Japan

[73] Assignee: Nitto Chemical Industry Company, Ltd., Tokyo, Japan

[21] Appl. No.: 321,284

[22] Filed: Mar. 9, 1989

[30] Foreign Application Priority Data

Mar. 16, 1988 [JP] Japan .................................. 63-64399
Oct. 6, 1988 [JP] Japan ................................. 63-250860

[51] Int. Cl.$^5$ ............................................. H01B 1/00
[52] U.S. Cl. ................................... 252/500; 524/236; 524/261; 524/267; 524/315; 524/361
[58] Field of Search ................ 252/500; 524/236, 315, 524/261, 267, 356, 361

[56] References Cited

U.S. PATENT DOCUMENTS

| | | | |
|---|---|---|---|
| 4,359,411 | 11/1982 | Kim et al. | 252/500 |
| 4,374,048 | 2/1983 | Kim et al. | 252/500 |
| 4,622,355 | 11/1986 | Arnold et al. | 252/500 |
| 4,734,220 | 3/1988 | Jonas et al. | 252/500 |
| 4,769,177 | 9/1988 | Hocker et al. | 252/500 |
| 4,803,011 | 2/1989 | Barraud et al. | 252/500 |

FOREIGN PATENT DOCUMENTS

| | | |
|---|---|---|
| 4822528 | 3/1973 | Japan . |
| 50-123750 | 9/1975 | Japan . |
| 54-130651 | 10/1979 | Japan . |
| 55-142050 | 11/1980 | Japan . |
| 58-34841 | 3/1983 | Japan . |

OTHER PUBLICATIONS

Nippon Kagaku Kaisha, 1977 (3), pp. 395-402.

*Primary Examiner*—Josephine Barr
*Attorney, Agent, or Firm*—Oblon, Spivak, McClelland, Maier & Neustadt

[57] ABSTRACT

A conducting varnish composition consisting essentially of:
(a) a tetracyanoquinodimethane complex salt;
(b) a high molecular weight compound;
(c)
  (i) at least one compound selected from the group consisting of acetals, orthoformic acid esters, orthoacetic acid esters, orthocarbonic acid esters, siloxanes, silyl ethers and orthosilicic acid esters; and/or
  (ii) a surfactant or a silicone oil; and
(d) a solvent.

the TCNQ complex salt is stable in a solution of the composition according to the present invention and the composition can be stored for a long period of time. Therefore, it provides a conducting material which exhibits a constant conductivity. Also, the composition of the present invention is excellent in the film-formability and moldability, and can be formed into a film or an article of good quality, that is, having no incomplete part.

17 Claims, 1 Drawing Sheet

10 μm

10μm

10μm

CONDUCTING VARNISH COMPOSITION

The present invention relates to a conducting varnish composition. More particularly, it relates to a conducting varnish composition excellent in storage stability and/or film-formability comprising, as essential components, a tetracyanoquinodimethane complex salt (hereinafter referred to as TCNQ complex salt), a polymer compound, a solvent and at least one compound selected from the group consisting of acetals, orthoformic acid esters, orthoacetic acid esters, orthocarbonic acid esters, siloxanes, silyl ethers and orthosilicic acid esters; and/or surfactants or silicone oils.

The composition of the present invention is used for conducting paste, electronic circuit, capacitor, heat sensitive device, conducting paper, antistatic film, antistatic coating composition and coating composition for electromagnetic shielding.

Heretofore, as conducting compositions, there have been well known those containing a cationic polymer as a main component and those consisting of a polymer having dispersed therein a metal or carbon. However, the composition containing a cationic polymer as a main component has low conductivity and high hygroscopicity. Also, the composition consisting of a polymer having dispersed therein a metal or carbon is disadvantageous in that the film formed therefrom is insufficient in smoothness and transparency.

On the other hand, as conducting compositions containing TCNQ, there have been known:

(1) a composition consisting of a polymer having quaternary nitrogen-containing cationic groups and TCNQ; and
(2) a composition consisting of a high molecular weight compound and a complex salt of TCNQ with a low molecular weight organic compound.

Since the composition (1) has very low solubility in general organic solvents and can dissolve only in special solvents having high polarity such as dimethylformamide and the like, the application thereof is restricted, and hence, said composition is not practical.

The composition (2) is disclosed in U.S. Pat. No. 3,424,698, Japanese Patent Application Kokai No. 50-123750, Japanese Patent Application Kokai No. 54-130651, etc. However, there have been a few reports on the stability of a solution of the composition (varnish or lacquer). For example, a TCNQ complex salt is labile in its solution, and therefore, its resistivity changes largely with time (Nippon Kagaku Kaishi, 1977, (3), 395-402).

Although a varnish consisting of a solution of a TCNQ complex salt and a high molecular weight compound in a solvent brings out vivid green immediately after it is made, it turns brown gradually in several days. The article formed from the discolored varnish has much less conductivity as compared with the undiscolored one. This may be because the TCNQ complex salt as a conducting component decomposes.

In order for the varnish containing the TCNQ complex salt, a high molecular weight compound and a solvent as essential components to be put to practical use as various conducting materials or antistatic materials, it is required to suppress the decomposition of the TCNQ complex salt to obtain a varnish excellent in storage stability for a long period of time.

Japanese Patent Application Kokai No. 55-142050 discloses a lacquer composition for preparing a highly dielectric film excellent in shelf life which is obtained by dissolving a phenoxy resin and a TCNQ complex salt in N,N-dimethylformamide and further adding TCNQ thereto. However, TCNQ has a very low solubility in solvents other than polar solvents such as N,N-dimethylformamide and the like, and therefore, applicable solvents have been restricted.

Further, the composition (2) does not have sufficient film-formability and moldability when it is formed into an extremely thin film of 50 $\mu$m or less, particularly 10 $\mu$m or less in thickness. That is to say, the thick film formed from said composition is unsatisfactory in uniformity of its surface. The surface film touches rough or has spots, and therefore, the film is poor in practicality.

In order to obtain a high conductivity, it has heretofore been considered undesirable to bring a conducting organic component (that is, the TCNQ complex salt in the present invention) and a high molecular weight compound to a state close to the solution (Japanese Patent Application Kokai No. 54-130650). Japanese Patent Application Kokai No. 58-34841 proposes to allow a TCNQ complex salt to grow as fine needle-shaped or fiber-like crystals in the form of three-dimensional net in a high molecular weight in order to make a highly conducting film. That is to say, the conventional knowledge is that in the case of a mixture of a high molecular weight compound and a TCNQ complex salt, crystals of the TCNQ complex salt grow in the high molecular weight compound, and the larger the number of overlaps of the crystals, the higher the conductivity. However, the compatibility of the high molecular weight compound with the TCNQ complex salt is small, and therefore, the film obtained from said composition is insufficient in transparency and surface smoothness. Particularly, there is a problem on film-making that an imperfect film is formed when preparing a film having a thickness of 50 $\mu$m or less from the composition, and therefore, it is difficult to apply the composition to a use requiring fine processing. Further, the existence of large crystals of the TCNQ complex salt in the film makes it impossible to form a thinner film than the dimension of the crystal. Further, since the refractive index of the polymer compound is different from that of the TCNQ complex salt crystal, the composition inevitably has insufficient transparency.

The present inventors have found that the storage stability of a conducting varnish composition containing, as essential components, the TCNQ complex salt, a high molecular weight compound and a solvent can be improved by adding thereto a specific compound such as an acetal or the like, whereby the decomposition of the TCNQ complex salt is suppressed, and the production of a conducting varnish composition which can be stored for a long period of time is made possible.

The present inventors have also found that the microcrystals of the TCNQ complex salt can be dispersed in the form of a substantial solution in the high molecular weight compound by adding a surfactant or a silicone oil to said conducting varnish composition, whereby an organic conducting composition can be obtained, which enables the formation of a conducting ultra thin film having smooth surface or a conducting article requiring a fine processing.

An object of the present invention is to provide a highly conducting varnish composition excellent in storage stability.

A further object of the invention is to provide a highly conducting varnish composition excellent in film-formability and moldability.

A still further object of the invention is to provide a highly conducting varnish composition capable of forming a highly conducting film excellent in transparency and flexibility.

Figure 2:
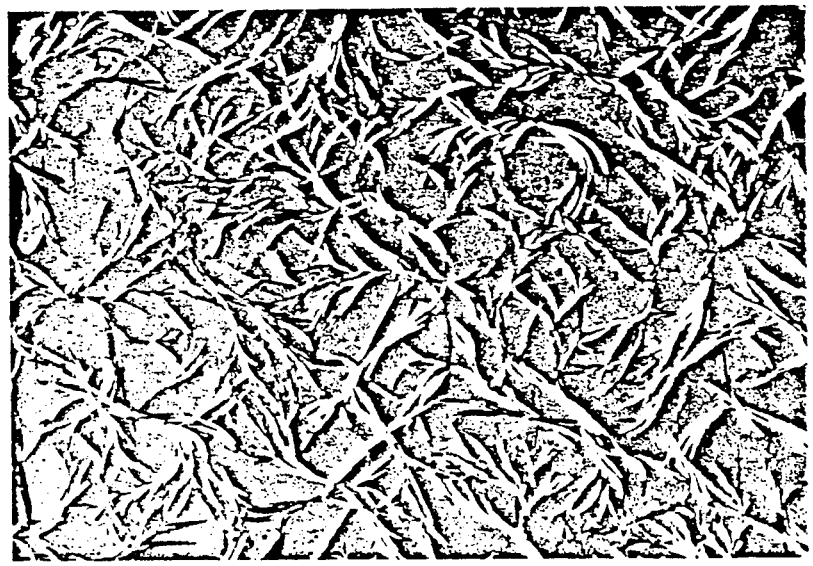

Other objects and advantages of the present invention will become apparent from the following description and the accompanying drawings. In the drawings, FIG. 1 is a polarization micrograph showing the state of crystals in a conducting thin film (of 0.5 μm in thickness) obtained from the varnish composition of this invention (Example 1) and FIG. 2 is an optical micrograph showing the state of crystals in a conducting thick film (of 12 μm in thickness) obtained (Example 6).

According to the present invention, a conducting varnish composition consisting essentially of:

(a) a tetracyanoquinodimethane complex salt;
(b) a high molecular weight compound;
(c)
  (i) at least one member selected from the group consisting of acetals, orthoformic acid esters, orthoacetic acid esters, orthocarbonic acid esters, siloxanes, silyl ethers and orthosilicic acid esters; or
  (ii) a surfactant or a silicone oil or
  (iii) a mixture of (i) and (ii), and
(d) a solvent is provided.

The TCNQ complex salt is reported in detail in J. Am. Chem. Soc., 84, 3374 (1962). In the present invention, the complex salt represented by $D^+ \cdot TCNQ^- \cdot TCNQ^0$ is preferred as the TCNQ complex salt. The $D^+$ is selected from the group consisting of organic cations represented by the following structural formulas:

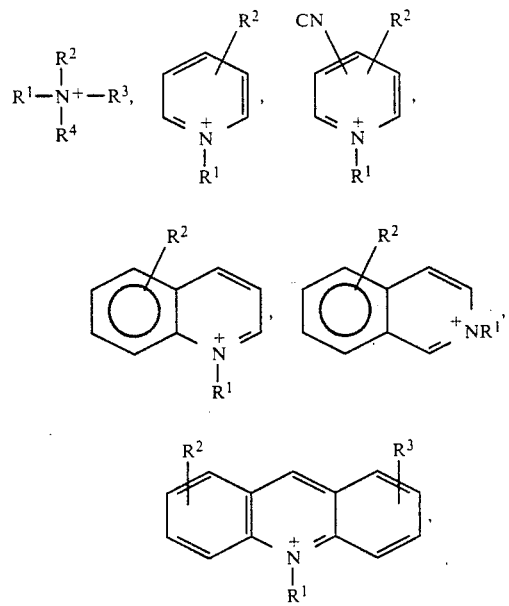

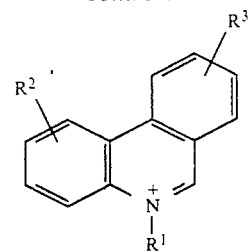

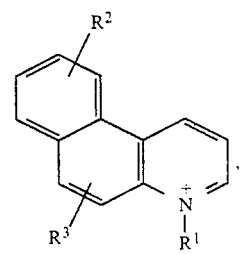

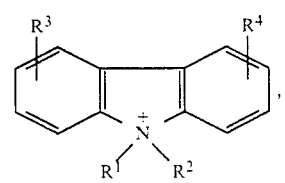

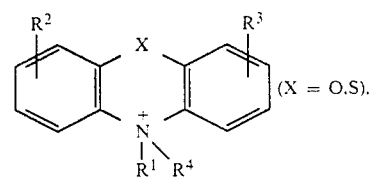

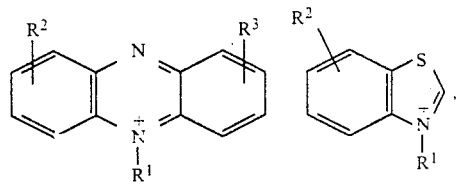

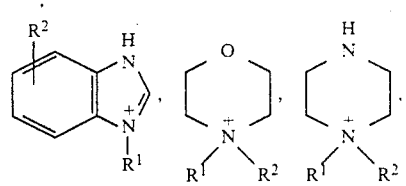

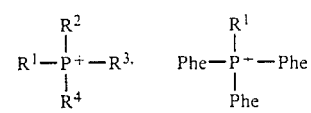

wherein $R^1$ represents H, an alkyl group having 1–30 carbon atoms, a benzyl group or a phenylethyl group, and each of $R^2$, $R^3$ and $R^4$ represents H or an alkyl group having 1–12 carbon atoms.

Also, a TCNQ complex salt of a polymer having quaternary nitrogen-containing cationic groups may be used as the TCNQ complex salt.

Although the type of the high molecular weight compound is not critical, there are preferred those having no interaction with the TCNQ complex salt such as, for example, those having neither free primary or secondary amino group nor free acid group as the main constructive residue. Specifically, a mention may be made of polymethacrylic acid esters, polyacrylic acid esters, polyacrylonitrile, polymethacrylonitrile, polystyrene, polyvinyl chloride, polyvinyl acetate, polyvinyl acetal, polyvinylidene fluoride, polyethylene oxide, polyesters, polycarbonates, polyvinyl carbazole, polyvinyl pyrrolidone, polyvinyl pyridine, polysulfones, polyphenylene sulfide, polyimide resins, ether resins, ketone resins, polyparabanic acid, polyurethanes, phenol resins, silicone resins and the like. The above-mentioned high molecular weight compounds may be used alone or in admixture of two or more. Also, there can be used a copolymer of at least two monomers selected from the monomers which form the above-mentioned vinyl polymers. The above-mentioned high molecular weight compound may contain a monomer or oligomer which can polymerize into a high polymer upon heating or light-irradiation after the formation of a coating film or the like.

The conducting varnish composition of the present invention contains the (c)(i) component (hereinafter referred to as a stabilizer in some places) including an acetal, etc. to improve the storage stability and the (c)(ii) component including a surfactant, etc. to improve the film-formability.

The acetal, as one of the (c)(i) components, includes compounds represented by the formula:

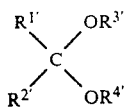

wherein each of $R^{1'}$ and $R^{2'}$ represents H, an alkyl group having 1-6 carbon atoms or a phenyl group and each of $R^{3'}$ and $R^{4'}$ represents an alkyl group having 1-6 carbon atoms, an ethylene group or a propylene group. Specifically, a mention may be made of $(CH_3)_2C(OCH_3)_2$, $(CH_3)_2C(OCH_3)(OC_2H_5)$, $PhCH(OC_4H_9)_2$, $Ph_2C(OC_2H_5)_2$ and the like.

The orthoformic acid ester, one of the (c)(i) components, includes compounds represented by the formula:

wherein R represents an alkyl group having 1-6 carbon atoms. Specifically, a mention may be made of $CH(OCH_3)_3$, $CH(OC_2H_5)_3$, $CH(OC_3H_7)_3$ and the like.

The orthoacetic acid ester, one of the (c)(i) components, includes compounds represented by the formula:

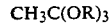

wherein R represents an alkyl group having 1-6 carbon atoms. Specifically, a mention may be made of $CH_3C(OCH_3)_3$, $CH_3C(OC_2H_5)_3$, $CH_3C(OC_3H_7)_3$ and the like.

The orthocarbonic acid ester, one of the (c)(i) components, includes compounds represented by the formula:

wherein R represents an alkyl group having 1-6 carbon atoms. Specifically, a mention may be made of $C(OCH_3)_4$, $C(OC_2H_5)_4$ and the like.

The siloxane, one of the (c)(i) components includes specifically disiloxanes such as $((CH_3)_3Si)_2O$, $((C_2H_5)_3Si)_2O$ and the like.

The silyl ether, one of the (c)(i) components, includes specifically $(CH_3)_3Si(OCH_3)$, $(C_2H_5)_3Si(OC_2H_5)$ and the like.

The orthosilicic acid ester, one of the (c)(i) components, includes specifically $Si(OCH_3)_4$, $Si(OC_2H_5)_4$, $Si(OC_3H_7)_4$ and the like.

The surfactant or silicone oil as the (c)(ii) component includes anionic surfactants, cationic surfactants, amphoteric surfactants, nonionic surfactants, fluorine-type surfactants, silicones and the like, and is added to in order to improve the film-formability and coating-formability, particularly thin-film-formability. Particularly preferred are nonionic surfactants, nonionic fluorine-type surfactants and silicones such as methyl silicone, dimethyl silicone and methylphenyl silicone.

The solvent as the (d) component includes amides such as dimethylformamide, dimethylacetamide, N-methylpyrrolidone and the like; nitriles such as acetonitrile, propionitrile and the like; alcohols such as methanol, ethanol, butanol and the like; ketones such as cyclohexanone, methylethylketone and the like; esters such as butyl acetate, amyl acetate and the like; ethers such as ethylene glycol dimethyl ether and the like; aromatic hydrocarbons such as toluene, xylene and the like; halogenated hydrocarbons such as dichloromethane, tetrachloroethane and the like. The above-mentioned solvents may be used alone or in admixture of two or more. Solvents on the market may be used as they are, though they are preferably used after being dehydrated through zeolite (e.g., molecular sieves 3A) or being purified by distillation.

The proportion of each component to the solvent is as follows:

The (a) component (TCNQ complex salt): 0.05-30% by weight, preferably 0.1-10% by weight.

The (b) component (high molecular weight compound): 0.05-100% by weight, preferably 1-50% by weight.

The (c)(i) component (acetal, etc.): 0.01-10% by weight, preferably 0.05-5% by weight.

The (c)(ii) component (surfactant, etc.): not more than 1% by weight, preferably 0.001-0.5% by weight when the varnish composition contains the (c)(i) component, or 0.001-20% by weight when the varnish composition contains no (c)(i) component, and preferably, 0.002-2% by weight in the case of a fluorine-type surfactant or 0.01-5% by weight in the case of the other surfactants.

The composition of the present invention can be prepared as a homogeneous solution or as a mixture in which each component is fully dispersed by adding to a solvent the TCNQ complex salt, a high molecular weight compound, the (c)(i) component and/or the (c)(ii) component and stirring the resulting mixture at room temperature or with heating.

As illustrated in the following Examples, the polarization micrographs of the conducting thin films made from the compositions of the present invention show that the blocks of microcrystals grown regularly have been formed at the whole surface of the respective films. Also, the optical micrograph of the conducting thick film made from the composition of the present invention shows that needle-shaped crystals overlap one another to form a reticular structure. The growth and overlap of the microcrystals is considered to exhibit the conductivity of the composition.

The present invention is explained more specifically below referring to Examples and Comparative Examples. However, the present invention should not be construed to be restricted to the Examples.

EXAMPLE 1

1 g of N-butylisoquinolinium TCNQ complex salt, 10 g of polymethyl methacrylate, 0.02 g of fluorine-type surfactant FC-431 (made by 3M) and 0.3 g of dimethylacetal were dissolved in a solvent consisting of 90 g of cyclohexanone and 10 g of n-butanol with stirring at room temperature. The resulting varnish was casted on a glass plate and dried at 70° C. to obtain a transparent film of 0.5 μm in thickness. Although the optical micrograph of this film does not show any growth of crystals, the polarization micrograph (FIG. 1) of the film shows that the blocks of microcrystals which have grown radially and regularly have been formed over the whole surface of the film. The surface resistance of the film was $3.5 \times 10^6$ Ω/□. After the above varnish had been stored in a sealed bottle for three months, it was formed into a film in the same manner as mentioned above. The polarization micrograph of the film shows the same feature as mentioned above. The surface resistance of the film was $5.0 \times 10^6$ Ω/□, from which only a small change of surface resistance with days is seen. Also, the color of the varnish was green and the same as before the storage.

COMPARATIVE EXAMPLE 1

The same procedure as in Example 1 was repeated except that the dimethyl acetal was not used, to make a film of a conducting varnish composition. The same feature of crystals as in Example 1 was observed through an optical microscope and a polarization microscope. The surface resistance of the film was $2.0 \times 10^6$ Ω/□. The above varnish composition was formed into a film in the manner as in Example 1 after the composition had been stored for three months. No blocks of microcrystals were observed through a polarization microscope. The surface resistance of the film increased up to $8 \times 10^{12}$ Ω/□ as compared with that before the storage. The color of the varnish had changed from green to brown.

COMPARATIVE EXAMPLE 2

The same procedure as in Example 1 was repeated, except that N,N-dimethylformamide was substituted for the dimethylacetal to make a film of a conducting varnish composition. The surface resistance of the film was $5.6 \times 10^6$ Ω/□ before the storage. After the above varnish was stored for three months, it was formed into a film. No blocks of microcrystals which grew radially and regularly were observed on the film through a polarization microscope. The surface resistance of the film was more than $10^{12}$ Ω/□. The color of the varnish was different from that before the storage.

EXAMPLES 2-5

The same procedure as in Example 1 was repeated, except that the type and the amount of each component were changed as shown in Table 1, to make a film of a conducting varnish composition. The surface resistances before and after the storage are shown in Table 1.

COMPARATIVE EXAMPLES 3 and 4

The same procedure as in Example 2 or 3 was repeated, except that no stabilizer was added, to make a film of a conducting varnish composition. The surface resistances before and after the storage are shown in Table 1.

EXAMPLE 6

30 g of polyvinylbutyral and 1 g of ethyl orthoformate were dissolved in a solvent consisting of 40 g of cyclohexanone and 30 g of butanol, and thereto was added 5 g of N-butylquinolinium TCNQ complex salt. The resulting mixture was fully stirred. The resulting varnish was coated on a glass plate and then dried at 70° C. to obtain a film of 12 μm in thickness. The optical micrograph (FIG. 2) of the film shows that large needle-shaped crystals are overlapped and connected to one another to form a reticular structure. The surface resistance of the film was $7.5 \times 10^3$ Ω/□.

After the varnish was stored in a sealed bottle for three months, it was formed into a film in the same manner as mentioned above. The same growth of needle-shaped crystals was observed as before the storage. The surface resistance of the film was $1.5 \times 10^4$ Ω/□ and changed little with days. The color of the varnish was green and the same as before the storage.

EXAMPLE 7

A mixture of 3 g of N,N-diethylmorpholinium TCNQ complex salt, 20 g of a copolymer (copolymerization ratio 7:3) of methyl methacrylate with styrene and 0.5 g of diethylacetal was treated with molecular sieves 3A, and thereto was added 80 g of cyclohexanone purified by distillation. The resulting varnish was coated on a glass plate and dried at 70° C. to obtain a film of 10 μm in thickness. The observation through an optical microscope clarified that fine needle-shaped crystals were overlapped and connected to one another to form a reticular structure. The surface resistance of the film was $4.3 \times 10^4$ Ω/□

After the varnish was stored in a sealed bottle for three months, it was formed into a film in the same manner as mentioned above. The same growth of needle-shaped crystals was observed as before the storage. The surface resistance of the film was $9.5 \times 10^4$ Ω/□, from which only a small change of surface resistance with days is seen. The color of the varnish did not change.

COMPARATIVE EXAMPLE 5

The same procedure as in Example 7 was repeated, except that the diethylacetal was not used, to make a film of a conducting varnish composition. The same feature of crystals as in Example 7 was observed through an optical microscope. The surface resistance of the film was $3.0 \times 10^4$ Ω/□. After the varnish was stored in a sealed bottle for three months, it was formed into a film. Few needle-shaped crystals were observed on the surface of the film through an optical microscope. The surface resistance of the film was $8.3 \times 10^7$ Ω/□, from which a change of surface resistance with days is seen. The color of the varnish changed from green to brown.

EXAMPLE 8

A mixture of 1.0 g of N,N-propylisoquinolinium TCNQ complex salt, 5.0 g of polyacrylonitrile, 45 g of dimethylformamide and 0.25 g of polyoxyethylene nonylphenyl ether (EMARGEN 903 made by Kao Corp.) was stirred at room temperature. The resulting green varnish was casted on a glass plate and dried at 100° C. to obtain a smooth film of 5 μm in thickness. The surface resistance of the film was $3.0 \times 10^3$ Ω/□. Although no crystal having a size of more than 5 μm was observed on the film through an optical microscope, the same feature of crystals as in FIG. 1 was observed through a polarization microscope.

EXAMPLE 9

0.6 g of N-decylquinolinium TCNQ complex salt, 2.0 g of a copolymer (copolymerization ratio 7:3) of methyl methacrylate with n-butyl acrylate, 40 g of ethanol, 20 g of acetonitrile, 30 g of cyclohexanone and 0.05 g of fluorine-type surfactant FC-431 (made by 3M) were stirred at room temperature. The resulting mixture was filtered, and the filtrate thereof was casted on a glass plate and dried at 100° C. to obtain a transparent smooth film of 1 μm in thickness. The surface resistance of the film was $1.5 \times 10^6$ Ω/□. No crystal having a size of more than 5 μm was observed on the film through an optical microscope.

EXAMPLE 10

1 g of N-hexylisoquinolinium TCNQ complex salt, 5.0 g of polymethyl methacrylate, 50 g of n-butanol, 20 g of acetonitrile, 30 g of methyl ethyl ketone and 0.34 g of silicone oil (KP341 made by Shin-Etsu Silicone Co., Ltd.) were stirred at room temperature. The resulting green varnish was casted on a glass plate and dried at 100° C. to obtain a smooth film of 3 μm in thickness. The surface resistance of the film was $6.0 \times 10^7$ Ω/□. No crystal having a size of more than 5 μm was observed on the film through an optical microscope.

EXAMPLE 11

0.4 g of N-butyl-α-picolinium TCNQ complex salt, 4.0 g of AS resin (STYRAC AS-967 made by ASAHI CHEMICAL INDUSTRY, CO., LTD.), 86 g of cyclohexanone, 10 g of acetonitrile and 0.2 g of sorbitan monolaurate (Rheodole SP-L10 made by Kao Corp.) were stirred at room temperature. The resulting green varnish was casted on a glass plate and dried at 100° C. to obtain a smooth film of 1 μm in thickness. The surface resistance of the film was $4.5 \times 10^7$ Ω/□. No crystal having a size of more than 5 μm was observed on the film through an optical microscope.

EXAMPLE 12

3.0 g of N-benzylpyridinium TCNQ complex salt, 10 g of polycarbonate, 70 g of dimethylformamide, 27 g of dioxane and 0.02 g of fluorine-type surfactant FC-431 (made by 3M) were stirred at room temperature. The resulting varnish was casted on a glass plate and dried at 100° C. to obtain a smooth film of 10 μm in thickness. The surface resistance of the film was $8.0 \times 10^8$ Ω/□. No crystal having a size of more than 5 μm was observed on the film through an optical microscope.

EXAMPLE 13

0.3 g of N-dodecylisoquinolinium TCNQ complex salt, 1.5 g of polyvinylbutyral, 30 g of butanol, 5 g of acetonitrile, 40 g of methyl ethyl ketone, 20 g of ethyl Cellosolve and 0.07 g of polyoxyethylene lauryl ether (EMARGEN-104P made by Kao Corp.) were stirred at room temperature. The resulting varnish was casted on a glass plate and dried at 100° C. to obtain a smooth film of less than 1 μm in thickness. The surface resistance of the film was $6.5 \times 10^8$ Ω/□. No crystal having a size of more than 5 μm was observed on the film through an optical microscope.

COMPARATIVE EXAMPLE 6

The same procedure as in Example 9 was repeated, except that the fluorine-type surfactant was not used, to make a film from a conducting varnish composition. The surface resistance of the film was $1.1 \times 10^6$ Ω/□. Fine unevenness was observed at the surface of the film. Crystals having a size of about 20 μm were observed on the film through an optical microscope. Also, the film had incomplete parts.

COMPARATIVE EXAMPLE 7

The same procedure as in Example 10 was repeated, except that the silicone oil was not used, to make a film from a conducting varnish composition. The surface resistance of the resulting film was $3.4 \times 10^7$ Ω/□. The film had fine unevenness at the surface of the film. Crystals having a size of about 50 μm were observed on the film through an optical microscope. Also, the film had incomplete parts.

EXAMPLE 14

1 g of N-butyl-N-methylmorpholinium TCNQ complex salt, 10 g of a polyarylate, 80 g of cyclohexanone, 20 g of dioxane and 0.01 g of fluorine-type surfactant FC-430 were stirred at room temperature. The resulting green varnish was casted on a glass plate and dried at 70° C. to obtain a transparent film of 1.5 μm in thickness. Although no crystal was observed on the film through an optical microscope, needle-shaped crystals were observed through a polarization microscope. The surface resistance of the film was $1.2 \times 10^8$ Ω/□.

EXAMPLE 15

1.1 g of N-butyl-N-methylmorpholinium TCNQ complex salt, 11 g of a polysulfone, 69 g of tetrachloroethane, 10 g of acetonitrile, 10 g of γ-butyrolactone and 0.01 g of fluorine-type surfactant FC-430 were stirred at room temperature. The resulting green varnish was casted on a glass plate and dried at 70° C. to obtain a film of 1.7 μm in thickness. The surface resistance of the film was $5.6 \times 10^8$ Ω/□.

EXAMPLE 16

2.25 g of N-hexylquinolinium TCNQ complex salt, 15 g of a polyimide, 60 g of cyclohexanone, 25 g of methyl Cellosolve and 0.01 g of fluorine-type surfactant FC-430 were stirred at room temperature. The resulting green varnish was casted on a glass plate and dried at 100° C. to obtain a film of 2.0 μm in thickness. The surface resistance of the film was $7.2 \times 10^6$ Ω/□.

EXAMPLE 17

1 0 g of N-butyl-α-picolinium TCNQ complex salt, 10 g of a polyester, 75 g of cyclohexanone, 15 g of methyl Cellosolve and 0.01 g of fluorine-type surfactant FC-430 were stirred at room temperature. The resulting green varnish was casted on a glass plate and dried at 70° C. to obtain a film of 0.7 μm in thickness. Although no crystal was observed on the film through an optical microscope, microcrystals which grew radially and regularly was observed through a polarization microscope. The surface resistance of the film was $3.0 \times 10^6$ $\Omega/\square$.

TABLE 1

| | Complex salt | | High molecular weight compound | | Surfactant | |
|---|---|---|---|---|---|---|
| | Type | Amount (g) | Type | Amount (g) | Type | Amount (g) |
| Example 2 | N-hexyl-β-picolinium TCNQ complex salt | 1.5 | polystyrene | 15 | FC-431 | 0.05 |
| Example 3 | N-benzyl-quinolinium TCNQ complex salt | 0.3 | polycarbonate | 10 | " | " |
| Example 4 | N-octyl-isoquinolinium TCNQ complex salt | 2.0 | polyvinyl-butyral | 20 | " | " |
| Example 5 | N-methyl-N-ethylmorpholinium TCNQ complex salt | 1.0 | AS resin | 10 | " | " |
| Comparative Example 3 | | | The same as in Example 2 | | The same as in Example 2 | |
| Comparative Example 4 | | | The same as in Example 3 | | The same as in Example 3 | |

| | Stabilizer | | Solvent | | Resistance at initial ($\Omega/\square$) | Resistance after 3 months ($\Omega/\square$) |
|---|---|---|---|---|---|---|
| | Type | Amount (g) | Type | Amount (g) | | |
| Example 2 | Methyl orthoformate | 0.5 | Cyclohexanone | 100 | $4.2 \times 10^6$ | $7.5 \times 10^6$ |
| Example 3 | Ethyl orthocarbonate | 1.0 | Cyclohexanone Acetonitrile | 90 10 | $5.0 \times 10^7$ | $9.3 \times 10^7$ |
| Example 4 | Hexamethyl disiloxane | 0.1 | Cyclohexanone Acetonitrile | 80 20 | $7.0 \times 10^6$ | $1.5 \times 10^7$ |
| Example 5 | Triethyl-ethoxy silane | 0.3 | Cyclohexanone | 100 | $2.0 \times 10^7$ | $3.3 \times 10^7$ |
| Comparative Example 3 | None | | Cyclohexanone | 100 | $5.0 \times 10^6$ | $>10^{12}$ |
| Comparative Example 4 | None | | Cyclohexanone Acetonitrile | 90 10 | $4.7 \times 10^7$ | $>10^{12}$ |

What is claimed is:

1. A conducting varnish composition consisting essentially of:
   (a) 0.05-30% by weight of a tetracyanoquinodimethane complex salt;
   (b) 0.05-100% by weight of a thermoplastic polymer or a monomer or oligomer which can polymerize into a polymer;
   (c)
   (i) 0.01-10% by weight of at least one member selected from the group consisting of acetals, orthoformic acid esters, orthoacetic acid esters, orthocarbonic acid esters, siloxanes, silyl ethers and orthosilicic acid esters; or
   (ii) 0.001-20% by weight of a surfactant selected from the group consisting of anionic surfactants, cationic surfactants, amphoteric surfactants, nonionic surfactants, fluorine-containing surfactants and silicone oils; or
   (iii) 0.01-11% by weight of a mixture of (i) and (ii), and
   (d) a solvent wherein all percentages are based on the weight of the solvent.

2. A conducting varnish composition according to claim 1, wherein the (c) component is the (c)(i) component.

3. A conducting varnish composition according to claim 1, wherein the (c) component is the (c)(iii) component.

4. A conducting varnish composition according to claim 1, wherein (c) component is the (c)ii) component.

5. A conducting varnish composition according to claim 1, wherein the tetracyanoquinodimethane complex salt has an organic cation represented by the following formula:

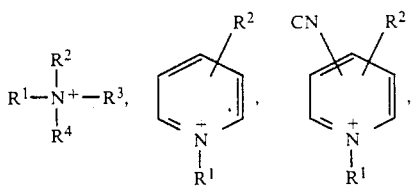

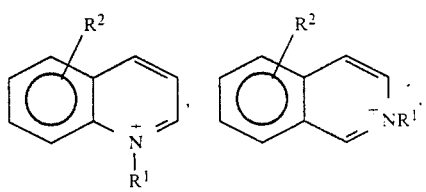

13

-continued

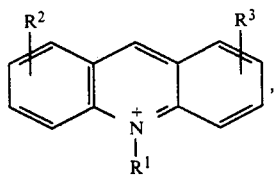

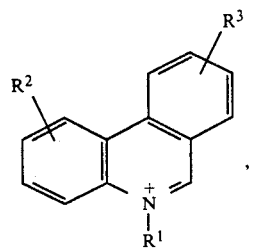

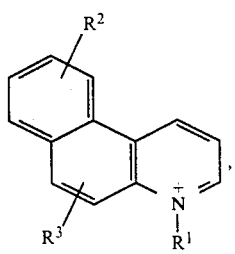

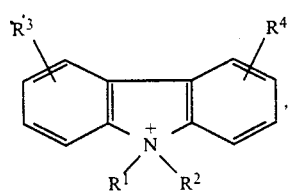

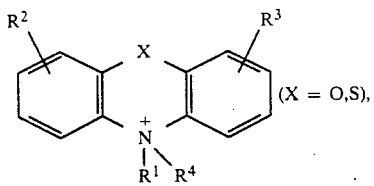

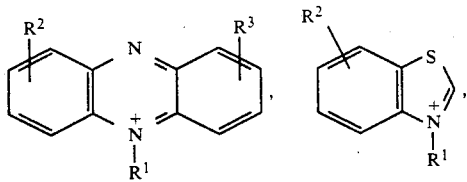

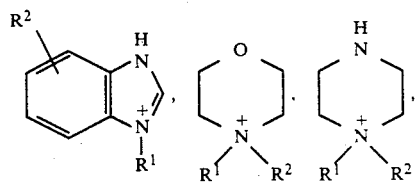

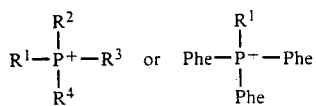

where $R^1$ represents H, an alkyl group having 1-30 carbon atoms, a benzyl group or a phenylethyl group, and each of $R^2$, $R^3$ and $R^4$ independently represents H or an alkyl group having 1-12 carbon atoms.

6. A conducting varnish composition according to claim 1, wherein the tetracyanoquinodimethane complex salt is a polymer having quaternary nitrogen-containing cation groups.

7. A conducting varnish composition according to claim 1, wherein the tetracyanoquinodimethane complex salt is selected from the group consisting of N-butylisoquinolinium tetracyanoquinodimethane complex salt, N-butylquinolinium tetracyanoquinodimethane complex salt, N-propylisoquinolinium tetracyanoquinodimethane complex salt, N-amylisoquinolinium tetracyanoquinodimethane complex salt, N-hexylquinolinium tetracyanoquinodimethane complex salt, N-hexylisoquinolinium tetracyanoquinodimethane complex salt, N-octylisoquinolinium tetracyanoquinodimethane complex salt, N-octylquinolinium tetracyanoquinodimethane complex salt, N-decylquinolinium tetracyanoquinodimethane complex salt, N-dodecylisoquinolinium tetracyanoquinodimethane complex salt, N-dodecylquinolinium tetracyanoquinodimethane complex salt, N-benzylquinolinium tetracyanoquinodimethane complex salt, N-hexyl-α-picolinium tetracyanoquinodimethane complex salt, N-hexyl-β-picolinium tetracyanoquinodimethane complex salt, N-butyl-α-picolinium tetracyanoquinodimethane complex salt, N-butyl-β-picolinium tetracyanoquinodimethane complex salt, N-methyl-N-ethylmorpholinium tetracyanoquinodimethane complex salt, N,N-diethylmorpholinium tetracyanoquinodimethane complex salt, N-butyl-N-methylmorpholinium tetracyanoquinodimethane complex salt and N-benzylpyridinium tetracyanoquinodimethane complex salt.

8. A conducting varnish composition according to claim 1, wherein the high molecular weight compound is selected from the group consisting of polymethyl methacrylate, polystyrene, polycarbonates, polyvinylbutyral, AS resin, polyacrylonitrile, polyarylates, polysulfones, polyimides, polyesters, a copolymer of methyl methacrylate with n-butyl acrylate and a copolymer of methyl methacrylate with styrene.

9. A conducting varnish composition according to claim 1, wherein the (c)(i) component is at least one member selected from the group consisting of acetals represented by the following formula:

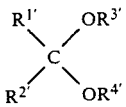

wherein each of $R^{1'}$ and $R^{2'}$ represents independently H, an alkyl group having 1-6 carbon atoms or a phenyl group and each of $R^{3'}$ and $R^{4'}$ represents independently an alkyl group having 1-6 carbon atoms, an ethylene group or a propylene group; orthoformic acid esters represented by the following formula:

$$CH(OR)_3$$

wherein R represents an alkyl group having 1-6 carbon atoms; orthoacetic acid esters represented by the following formula:

$$CH_3C(OR)_3$$

wherein R represents an alkyl group having 1-6 carbon atoms; orthocarbonic acid esters represented by the following formula:

C(OR)₄ wherein R represents an alkyl group having 1-6 carbon atoms; siloxanes; silyl ethers; and orthosilicic acid esters.

10. A conducting varnish composition according to claim 1, wherein the (c)(i) component is at least one member selected from the group consisting of (CH₃)₂C(OCH₃)₂, (CH₃)₂C(OCH₃)(OC₂H₅), PhCH(OC₄H₉)₂, Ph₂C(OC₂H₅)₂, CH(OCH₃)₃, CH(OC₂H₅)₃, CH(OC₃H₇)₃, CH₃C(OCH₃)₃, CH₃C(OC₂H₅)₃, CH₃C(OC₃H₇)₃, C(OCH₃)₄, C(OC₂H₅)₄, ((CH₃)₃Si)₂O, ((C₂H₅)₃Si)₂O, (CH₃)₃Si(OCH₃), (C₂H₅)₃Si(OC₂H₅), Si(OCH₃)₄, Si(OC₂H₅)₄ and Si(OC₃H₇)₄.

11. A conducting varnish composition according to claim 2, wherein the (c)(i) component is at least one member selected from the group consisting of dimethylacetal, diethylacetal, methyl orthoformate, ethyl orthoformate, ethyl orthocarbonate, hexamethyldisiloxane and triethylethoxysilane.

12. A conducting varnish composition according to claim 3, wherein the (c)(i) component is at least one member selected from the group consisting of dimethylacetal, diethylacetal, methyl orthoformate, ethyl orthoformate, ethyl orthocarbonate, hexamethyldisiloxane and triethylethoxysilane.

13. A conducting varnish composition according to claim 3, wherein the (c)(ii) component is selected from the group consisting of a fluorine-containing surfactant, polyoxyethylene nonylphenyl ether, silicone oils, sorbitan monolaurate and polyoxyethylene lauryl ether.

14. A conducting varnish composition according to claim 4, wherein the (c)(ii) component is selected from the group consisting of a fluorine-containing surfactant, polyoxyethylene nonylphenyl ether, silicone oils, sorbitan monolaurate and polyoxyethylene lauryl ether.

15. A conducting varnish composition according to claim 1, wherein the solvent is at least one member selected from the group consisting of amides, nitriles, alcohols, ketones, esters, aromatic hydrocarbons and halogenated hydrocarbons.

16. A conducting varnish composition according to claim 1, wherein the solvent is at least one member selected from the group consisting of dimethyl formamide, N-methylpyrrolidone, γ-butyrolactone, acetonitrile, propionitrile, methanol, ethanol, butanol, cyclohexanone, methyl ethyl ketone, dioxane, butyl acetate, amyl acetate, methyl cellosolve, ethyl cellosolve, ethylene glycol dimethyl ether, toluene, xylene, dichloromethane and tetracholorethane.

17. A conducting varnish composition according to claim 3, wherein the proportions of the tetracyanoquinodimethane complex salt, the high molecular weight compound, the (c)(i) component and the (c)(ii) component are 0.05-30%, 0.05-100%, 0.01-10% and less than 1%, respectively, based on the weight of the solvent.

* * * * *